United States Patent [19]

Braunheim et al.

[11] Patent Number: 6,069,772
[45] Date of Patent: May 30, 2000

[54] BASE PLATE FOR MAGNETIC READ SUSPENSION IN HARD DISK DRIVE WITH MATERIAL FOLD-OVER

[75] Inventors: Steve Braunheim; Russ Anderson; Kevin Hanrahan; Ryan Schmidt, all of Santa Barbara, Calif.

[73] Assignee: Intri-Plex Technologies, Inc., Goleta, Calif.

[21] Appl. No.: 08/943,377

[22] Filed: Oct. 3, 1997

[51] Int. Cl.[7] .............................. G11B 5/48; B23P 11/00
[52] U.S. Cl. ........................................ 360/104; 29/33 D
[58] Field of Search .................................. 360/104, 105; 29/603.07, 566.1, 505, 33 D, 33 K, DIG. 3; 72/51, 319, 323, 382; 413/73, 75

[56] References Cited

U.S. PATENT DOCUMENTS

| | | | |
|---|---|---|---|
| 5,390,058 | 2/1995 | Yamaguchi | 360/104 |
| 5,528,092 | 6/1996 | Ohta | 310/67 R |

*Primary Examiner*—George J. Letscher
*Attorney, Agent, or Firm*—Owen L. Lamb

[57] ABSTRACT

An arm assembly movable about a pivot includes means for holding a recording head slider on the arm assembly. The arm assembly includes an actuator arm supported at one end at the pivot, and a load beam connected to an end opposite to the one end of the actuator arm and extending to the slider. The load beam includes a load beam boss hole of a given diameter and the actuator arm includes an actuator arm boss hole. The boss holes are superposed at a connection of the load beam and the actuator arm. The hub includes a fold of material into an outside surface of the hub. The hub extends through the boss holes to maintain the actuator arm and the load beam together. The hub is swaged (expanded) to fix the actuator arm to the load beam such that the fold in the outside surface of the boss grips the actuator arm boss hole. The presence of the fold increases the hub material's ability to achieve a high retention torque in the tension direction by acting as a lever during the swage operation, thrusting the material with greater force into the material of the arm boss hole.

11 Claims, 2 Drawing Sheets

BASE PLATE FOR MAGNETIC READ SUSPENSION IN HARD DISK DRIVE WITH MATERIAL FOLD-OVER

BACKGROUND OF THE INVENTION

1. Field of the Invention

This invention relates to disk head assemblies for supporting read/write heads adjacent rotating disks in disk drives and more particularly, to a base plate for attaching a load beam assembly to a head actuator arm.

2. Description of the Prior Art

Disk drives typically include a stack of spaced apart, concentric magnetic storage disks mounted on a common shaft, and an actuator arm assembly encased within a housing. The actuator arm assembly, also called a head stack assembly (HSA), comprises a plurality of arms extending into spacing between the disks. Mounted on the distal end of each arm is a resilient suspension assembly to which is attached an air bearing slider, the combination of which is referred to as a head gimbal assembly (HGA). Included in the suspension assembly is a load beam, which is mounted at one end to the actuator arm by means of a base plate, and a flexure which is attached to the other end of the load beam and pivotally supports the slider on a gimbal that keeps the slider suspended in a horizontal plane on the disk surface regardless of any motion of the load beam. The base plate has a flange and a hollow hub. The hub is passed through and extends beyond a hole in the load beam and the flange is welded to the load beam. The hub is then inserted into a boss hole in the actuator arm and the hub is swaged to provide a press fit within the actuator arm boss hole.

The load beam provides the resilient spring action that biases the slider toward the surface of a magnetic recording disk, while the flexure provides flexibility for the slider. A thin film or other magnetic transducer is deposited or otherwise attached at the rearward end of the slider to read or write on the magnetic disk. A base plate is typically formed by flowing material into the hub region by extrusion from the flange region by a combination of forging and coining. With low hub, thin flange base plates there is often not enough material available in the flange material to flow during extrusion to fill the hub geometry, without decreasing the thickness of the hub.

An object of this invention is to provide a new method of manufacturing a base plate to connect a load beam to an actuator arm in a magnetic head assembly.

SUMMARY OF THE INVENTION

The invention is a base plate that has a flange and a hub that is formed with a fold portion extruded from the flange. In accordance with an aspect of the invention the fold portion may extend beyond an outer diameter of the hub to form a barb.

An advantage of this invention is that it allows the manufacture of base plates with extremely low profile hubs with relatively standard wall thickness by a metal stamping process.

A further advantage of this invention is that the presence of a fold reduces the hard material coupling between the flange and hub portions of the base plate, thereby reducing the gram load change through the swaging process.

A further advantage of this invention is that the presence of the fold increases the hub material's ability to achieve a high retention torque in the tension direction by acting as a lever during the swage operation, thrusting the material with greater force into the arm material, creating a greater press fit.

A further advantage of this invention is that if the fold is such that additional material extends outward to increase the outer diameter of the hub by forming a barb, this allows a press fit, thrusting the barb into the arm material, thereby eliminating the need to swage.

BRIEF DESCRIPTION OF THE DRAWINGS

The invention will be described in greater detail with reference to the drawings in which.

In these figures, similar numerals refer to similar elements in the drawing. It should be understood that the sizes of the different components in the figures may not be to scale, or in exact proportion, and are shown for visual clarity and for the purpose of explanation.

DETAILED DESCRIPTION OF THE INVENTION

Figure 1:
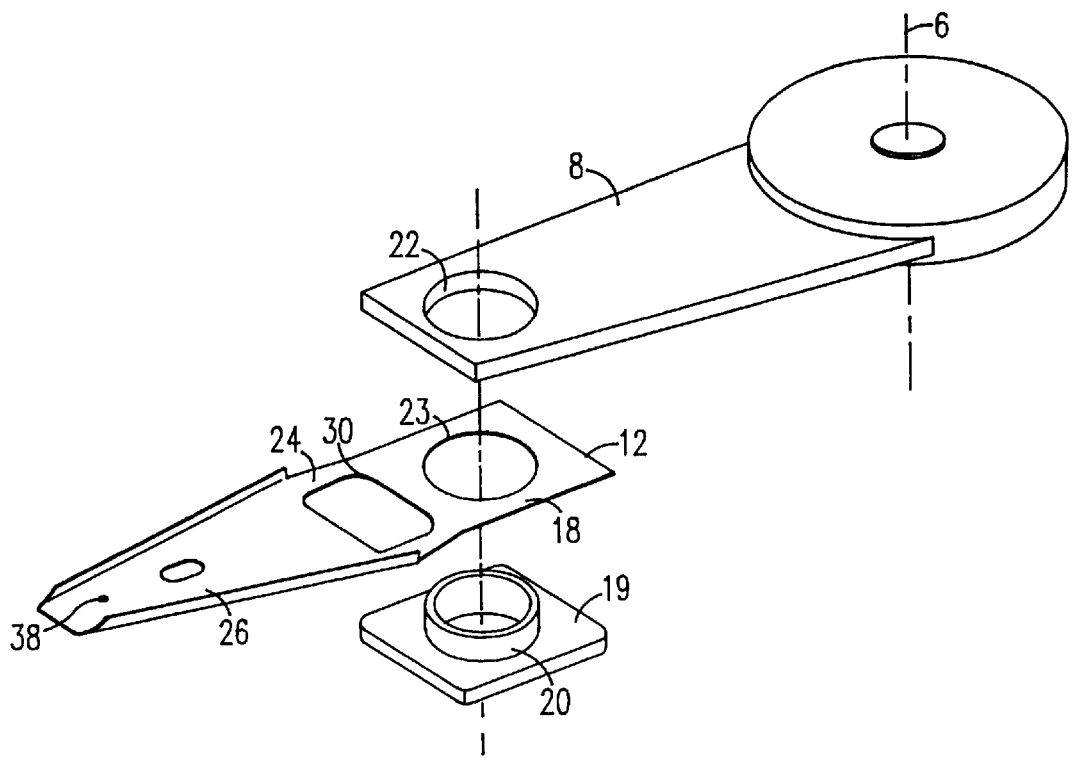
FIG. 1 is an exploded view of a disk drive magnetic head suspension in which the present invention is embodied.

A disk drive has an actuator arm assembly and a stack of spaced apart disks rotatable about a common shaft. The actuator arm assembly is rotatable about an actuator arm axis. The arm assembly includes a plurality of actuator arms which extend into the spaces between the disks. One such actuator arm is shown herein in FIG. 1. Attached to the actuator arm is a magnetic head suspension. The actuator arm when assembled in a stack with a number of identical actuator arms rotates about the actuator arm axis 6.

The magnetic he uspension comprises a resilient load beam 12, a flexure (not shown) and a slider (not shown) on the under side of the load beam 12. The load beam 12 includes a base section 18 having a boss hole 23. The load beam 12 includes a resilient section 24 located between the base section 18 and a protrusion section 26 of the load beam 12. The resilient section 24 is formed to create an angular offset between the base section 18 and protrusion section 26. The degree of bending determines the downward preload force of the slider toward a disk surface. The geometry of the load beam in resilient section 24 and/or the size of an aperture 30 in the resilient section 24 establishes the resilience of the load beam 12. A dimple 38 is formed in the load beam 12, or on the flexure, and is urged against the backside of the slider through a clearance and contributes to a gimbaling action of the slider. A transducer is disposed at the rear edge of the slider.

Figure 2:
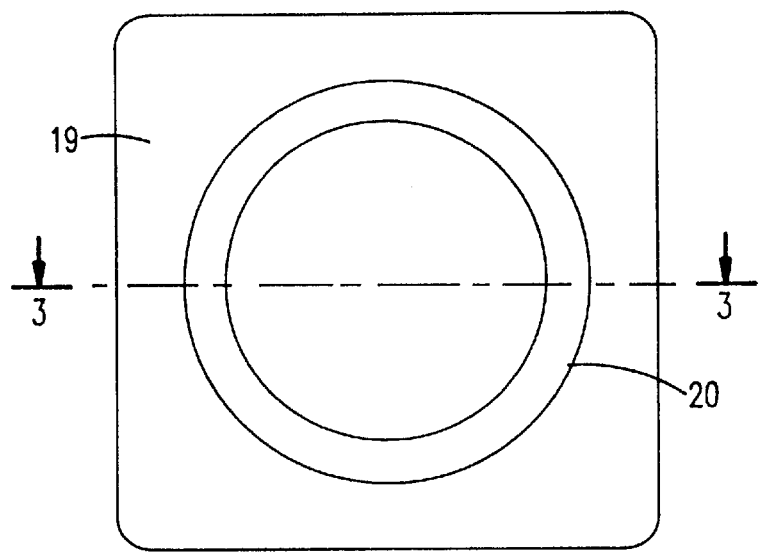
FIG. 2 is a top view of the base plate show in FIG. 1.

The actuator arm and load beam elements of the actuator arm assembly are connected end to end by the base plate which includes a flat flange portion 19 and a cylindrical hub portion or boss 20. A top view of the base plate is shown in FIG. 2. In assembling the actuator arm, the hub 20 is inserted through a load beam boss hole 23 and the flange portion 19 is welded to the load beam 18. The hub 20 is then inserted through an actuator arm boss hole 22. Using a swage machine, a swage ball is driven through the hub 20. The swage ball exerts pressure on the hub 20 which expands (swages) into the boss hole in the actuator arm. The expanded hub rigid connects the hub and attached load beam to the actuator arm boss hole. The expanded hub 20 creates a very tight friction fit against the sides of the boss hole 22. To ensure a tight fit, the length of the hub 20 is such that sufficient contact exists between the outer portion of the hub 20 and the inner portion of the boss hole 22. As the hub plastically deforms, it hardens, which is desirable for maintaining a press fit in the actuator arm boss hole.

Figure 3A:
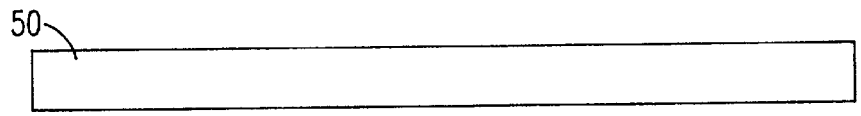
FIGS. 3a through 3d are side views along view line 3—3 of the base plate of FIG. 2 and illustrate the process of making a base plate in accordance with the teachings of the present invention; and, FIG. 4 is a side view of a base plate with a hub having a barb formed thereon.
Figure 3B:
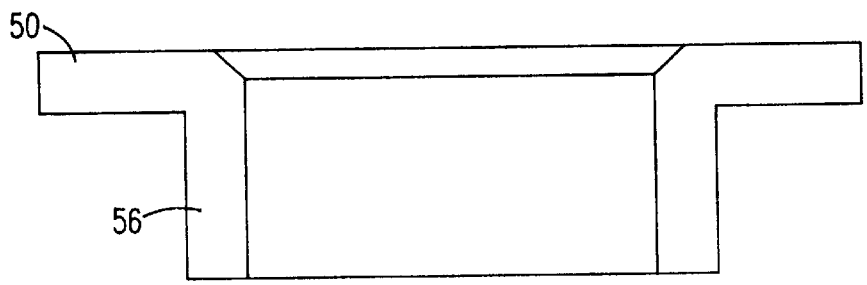
Figure 3C:
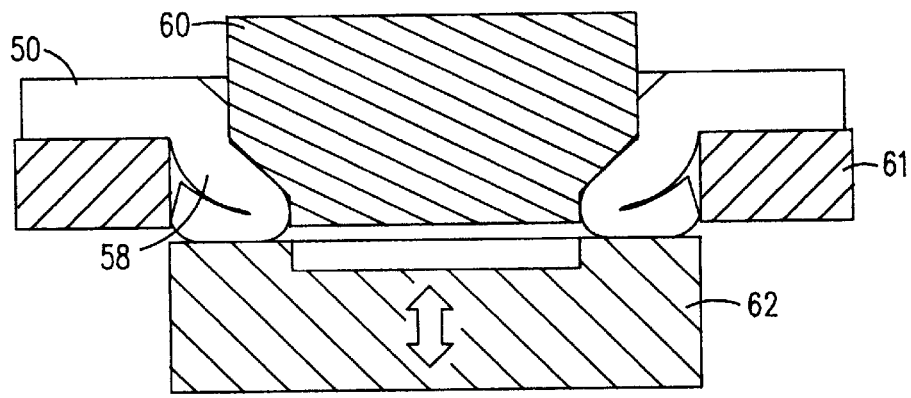
Figure 3D:
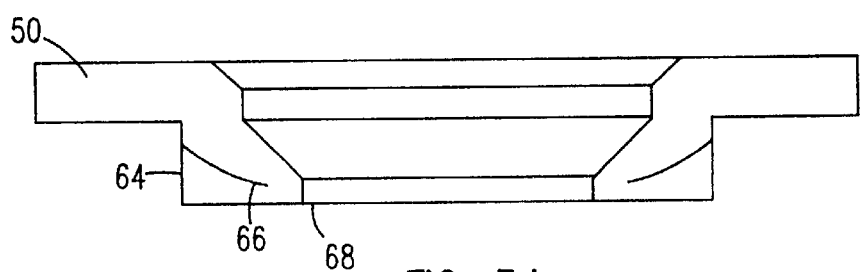

FIGS. 3a through 3d illustrate the steps of manufacturing base plates in accordance with the present invention. In FIG. 3a, a strip 50 of stainless steel is prepared. In FIG. 3b, using known manufacturing techniques, a cylinder 56 is formed. In FIG. 3c, the cylinder 56 is bent back on itself during a first punch/die stamping operation by actuating a suitable punch 62 back and forth into a die 60, 61 as illustrated by the arrow. This operation forms the extruded material into a bent shape 58. In FIG. 3d, the part is stamped in a second punch/die stamping operation to complete formation of the hub 64 with a fold portion 66.

Figure 4:
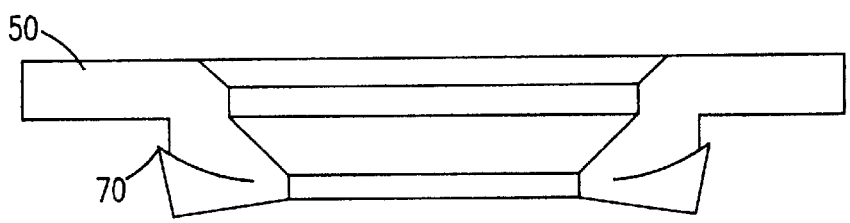

FIG. 4 is a side view of a base plate with a hub having a barb 70 formed thereon. In this case, the fold over portion 66 shown in FIG. 3d is exaggerated during the final stamping operation to cause the material to extend beyond the hub outer diameter indicated by the broken lines to thereby form a barb of a greater hub outer diameter.

It should be understood that the invention is not limited to the specific parameters, materials and embodiments described above. Various modifications and variations may be made within the scope of the present invention.

What is claimed is:

1. A method of manufacturing a base plate comprising steps of:
   A. preparing a sheet of metal;
   B. forming a cylinder in said sheet of metal;
   C. actuating a punch back and forth into a die to bend said cylinder outwardly forming a fold portion in an outside surface of said cylinder; and,
   D. stamping a hub from said folded cylinder resulting in a flange and a hub having a fold in said outside surface of said cylinder.

2. The method of claim 1 wherein said step C provides a folded cylinder that extends beyond said outside surface of said hub to form a barb.

3. A method of assembling a magnetic head suspension which includes a load beam having a boss therein and an actuator arm having an actuator arm boss hole therein, comprising steps of:
   A. forming a cylinder in said boss,
   B. actuating a punch back and forth into a die to bend said cylinder back on itself such that extruded material is formed into a bent shape outwardly from an outside surface of said cylinder;
   C. stamping a hub from said cylinder resulting in a flange and a hub having a fold therein;
   D. inserting said boss into said actuator arm boss hole, and,
   E. swaging said boss such that said boss grips said boss hole.

4. The method of claim 3 wherein said step A creates a fold that extends beyond an outer diameter of said boss to form a barb in said outside surface of said boss.

5. The method of claim 3 wherein said fold is exaggerated during said stamping step C to cause material to extend beyond a hub outer diameter to thereby form a barb in said outside surface of said cylinder.

6. In a method of assembling a magnetic head suspension which includes a load beam having a boss therein and an actuator arm having an actuator arm boss hole therein, which method includes swaging said boss, an improvement comprising steps of:
   A. creating a fold in an outside surface of said boss prior to said swaging said boss, such that extruded material is formed into a bent shape outwardly from an outside surface of said boss;
   B. inserting said boss into said actuator arm boss hole, and,
   C. swaging said boss such that said boss grips said boss hole.

7. The method of claim 6 wherein said step A creates a fold that extends beyond an outer diameter of said boss to form a barb in said outside surface of said boss.

8. A method of assembling a magnetic head suspension which includes a load beam having a boss therein and an actuator arm having an actuator arm boss hole therein, comprising steps of:
   A. forming a cylinder in said boss,
   B. actuating a punch back and forth into a die to bend said cylinder outwardly forming a fold portion in an outside surface of said cylinder;
   C. stamping a hub from said cylinder resulting in a flange and a hub having a fold therein;
   D. inserting said boss into said actuator arm boss hole, and,
   E. swaging said boss such that said boss grips said boss hole.

9. The method of claim 7 wherein said fold is exaggerated during said stamping step C to cause material to extend beyond a hub outer diameter to thereby form a barb in said outside surface of said cylinder.

10. A method of manufacturing a base plate comprising steps of:
    A. forming a cylinder in a sheet of metal;
    B. actuating a punch back and forth into a die to bend said cylinder back on itself such that extruded material is formed into a bent shape outwardly from an outside surface of said cylinder; and,
    C. stamping a hub from said cylinder resulting in a flange and a hub having a fold in said outside surface of said cylinder.

11. The method of claim 10 wherein said fold in said outside surface of said cylinder extends beyond said outside surface of said hub to form a barb.

* * * * *